United States Patent
Amburgey et al.

(10) Patent No.: US 11,040,896 B2
(45) Date of Patent: Jun. 22, 2021

(54) SYSTEM FOR REMOVING BROMIDE FROM A WASTEWATER STREAM

(71) Applicant: The University of North Carolina at Charlotte, Charlotte, NC (US)

(72) Inventors: James E. Amburgey, Kannapolis, NC (US); Olya Stepanovna Keen, Harrisburg, NC (US); Mei Sun, Charlotte, NC (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 202 days.

(21) Appl. No.: 15/624,465

(22) Filed: Jun. 15, 2017

(65) Prior Publication Data
US 2017/0362098 A1    Dec. 21, 2017

Related U.S. Application Data

(60) Provisional application No. 62/350,471, filed on Jun. 15, 2016.

(51) Int. Cl.
*C02F 1/42*         (2006.01)
*B01D 53/64*        (2006.01)
(Continued)

(52) U.S. Cl.
CPC ............ *C02F 1/42* (2013.01); *B01D 53/64* (2013.01); *B01D 2257/602* (2013.01);
(Continued)

(58) Field of Classification Search
CPC .. C02F 1/42; C02F 2001/422; C02F 2101/10; C02F 2101/12; C02F 2103/18;
(Continued)

(56) References Cited

U.S. PATENT DOCUMENTS

2013/0309157 A1*  11/2013  Sjostrom ............... B01D 53/64
                                                       423/242.1
2015/0096940 A1*   4/2015  Arias-Paic ............. B01J 47/04
                                                       210/677

FOREIGN PATENT DOCUMENTS

WO    WO-2014115133 A1 *  7/2014  .............. B01J 41/05

OTHER PUBLICATIONS

Purlite Corporation, Application Guide: Purolite resins for potable water and groundwater treatment, Sep. 2016 [Retrieved on Sep. 12, 2019]. Retreived from the internet. Retrieved from <https://www.purolite.com/dam/jcr:8167cb14-7993-4eef-a86c-f645f1a5af95/Potable%20and%20Groundwater%2009%202016.pdf>, (Year: 2016).*

(Continued)

*Primary Examiner* — Matthew O Savage
(74) *Attorney, Agent, or Firm* — J. Clinton Wimbish; Nexsen Pruet, PLLC

(57) ABSTRACT

In one aspect, systems and methods for the efficient and cost-effective removal of bromide from wastewater streams are described herein. Briefly, a system for bromide removal comprises pretreatment apparatus operable for at least partial removal of background ionic species from the wastewater stream and/or dilution of the background ionic species in the wastewater stream. The system also comprises bromide capture apparatus operable for removal of bromide from the pretreated wastewater stream, wherein the system removes bromide from the wastewater stream at an efficiency of at least 80 percent. In some embodiments, bromide is recovered from the capture apparatus and reused in flue gas treatment applications.

10 Claims, 1 Drawing Sheet

(51) Int. Cl.
*C02F 101/12* (2006.01)
*C02F 101/10* (2006.01)
*C02F 103/18* (2006.01)

(52) U.S. Cl.
CPC .. *C02F 2001/422* (2013.01); *C02F 2001/425* (2013.01); *C02F 2101/101* (2013.01); *C02F 2101/12* (2013.01); *C02F 2103/18* (2013.01); *C02F 2303/16* (2013.01)

(58) Field of Classification Search
CPC ... C02F 2303/16; B01D 15/12; B01D 15/125; B01D 15/363; B01D 53/64; B01D 2257/602; C01B 7/09; C01B 7/096; C01B 9/04
See application file for complete search history.

(56) References Cited

OTHER PUBLICATIONS

Product Data Sheet for Purolite Bromide Plus, Polystyrenic Macroporous, Type I Strong Base Anion Resin, Chloride form. Retrieved from the internet on Oct. 22, 2020. Retrieved from <<https://www.purolite.com/product/bromide-plus>>...(Year: 2020).*

* cited by examiner

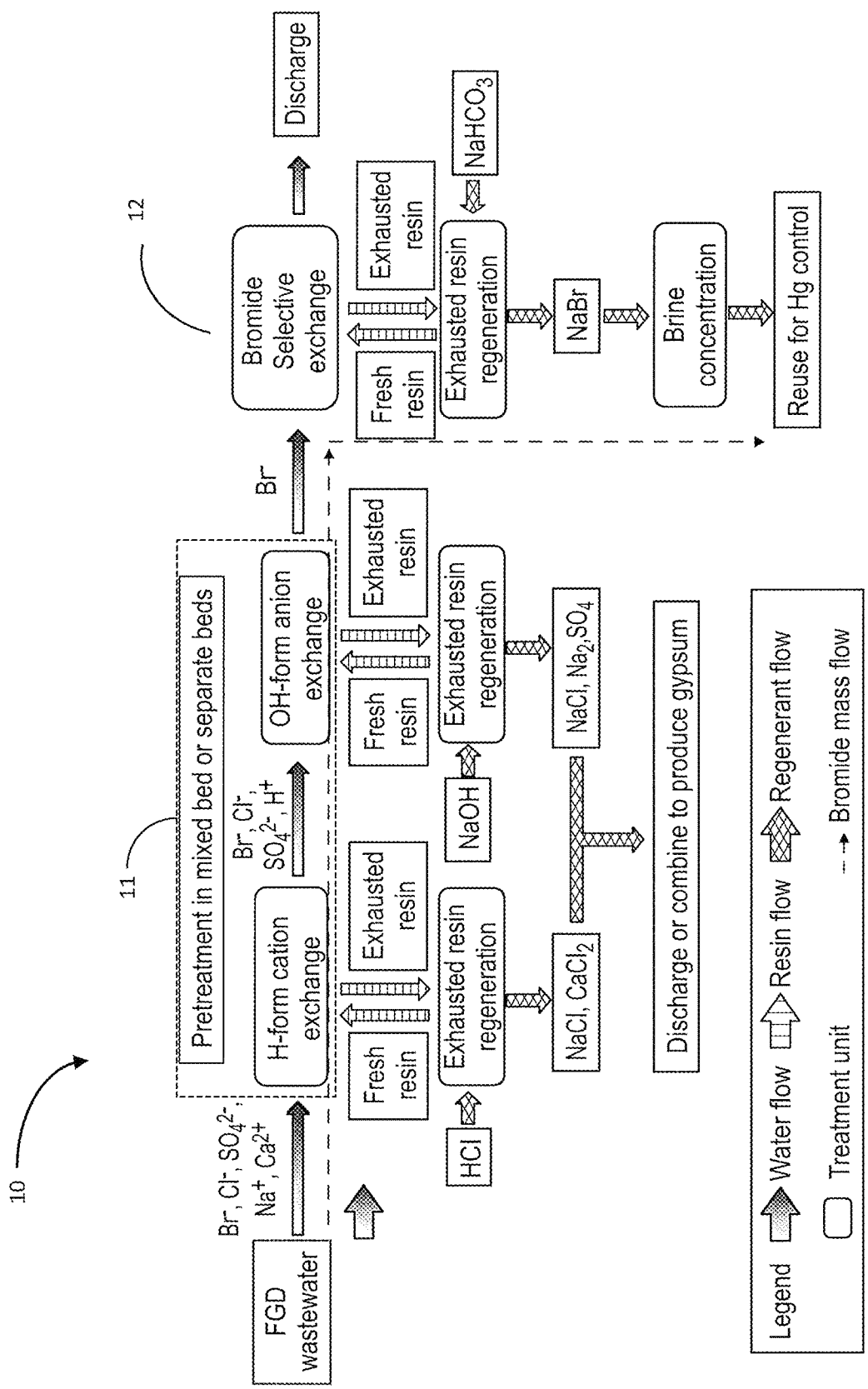

SYSTEM FOR REMOVING BROMIDE FROM A WASTEWATER STREAM

RELATED APPLICATION DATA

The present application claims priority pursuant 35 U.S.C. § 119(e) to U.S. Provisional Patent Application Ser. No. 62/350,471 filed Jun. 15, 2016 which is incorporated herein by reference in its entirety.

FIELD

The present invention relates to systems and methods for the treatment of industrial wastewater streams and, in particular, to the removal of bromide from wastewater streams.

BACKGROUND

To comply with the Mercury and Air Toxics Standard of the United States Environmental Protection Agency (US EPA), many coal-fired power plants treat coal with bromide (Bf) to lower mercury (Hg) emissions. Bromide reduces gas phase Hg emissions by converting elemental Hg into water-soluble $HgBr_2$ that is removed in wet flue gas desulfurization (FGD) units and transferred to FGD wastewater. While treatment of FGD wastewater targets the removal of Hg and other regulated constituents, bromide removal is not accomplished with current treatment approaches. As a result, wastewater discharges from coal-fired power plants equipped with wet FGD units have been identified as contributors to elevated bromide concentrations in several drinking water supplies across the United States.

To reduce bromide levels in FGD wastewater, some power plants have ceased using bromide for Hg control and switched to alternatives, such as activated carbon (AC) and organosulfides. However, AC ends up in the fly ash and reduces the resale value of fly ash, and organosulfides may lead to increased emissions of sulfur oxides. Therefore, it is economically desirable for power plants to continue using bromide. However, since current wastewater treatment processes are not capable of cost-effective bromide removal, new treatment processes for bromide removal are required.

SUMMARY

In one aspect, systems and methods for the efficient and cost-effective removal of bromide from wastewater streams are described herein. Briefly, a system for bromide removal comprises pretreatment apparatus operable for at least partial removal of background ionic species from the wastewater stream and/or dilution of the background ionic species in the wastewater stream. The system also comprises bromide capture apparatus operable for removal of bromide from the pretreated wastewater stream, wherein the system removes bromide from the wastewater stream at an efficiency of at least 80 percent. In some embodiments, the bromide capture apparatus comprises separation media exhibiting higher selectivity to bromide relative to the background ionic species.

In another aspect, a method of removing bromide from a wastewater stream comprises contacting the wastewater stream with pretreatment apparatus operable for at least partial removal of background ionic species from the wastewater stream and/or dilution of the background ionic species in the wastewater stream. The pretreated wastewater stream is subsequently contacted with bromide capture apparatus operable for removal of bromide from the pretreated wastewater stream, wherein bromide is removed from the wastewater stream at an efficiency of at least 80 percent. In some embodiments, bromide is recovered from the capture apparatus and reused in flue gas treatment applications. For example, bromide recovered from the bromide capture apparatus can be concentrated and reused for Hg control in coal-fired power stations.

These and other embodiments are described in greater detail in the following detailed description.

BRIEF DESCRIPTION OF THE DRAWINGS

FIG. 1 illustrates a bromide removal system for FGD wastewater treatment according to some embodiments.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Bromide Removal Systems

As described herein, a system for bromide removal comprises pretreatment apparatus operable for at least partial removal of background ionic species from the wastewater stream or dilution of the background ionic species in the wastewater stream. The system also comprises bromide capture apparatus operable for removal of bromide from the pretreated wastewater stream, wherein the system removes bromide from the wastewater stream at an efficiency of at least 80 percent. As described further herein, bromide can be recovered from the capture apparatus. The recovered bromide, for example, can be concentrated and reused in various applications including, but not limited to, Hg control in coal-fired power stations.

Turning now to specific components, the pretreatment apparatus can comprise media for partial or complete removal of background ionic species in the wastewater stream. Background ionic species can be dependent on several considerations, including source of the wastewater stream and path of the wastewater to the pretreatment apparatus. In some embodiments, for example, the wastewater stream is sourced from FGD units associated with coal-fired power generation stations. In such embodiments, background ionic species of the wastewater stream can comprise alkaline earth cations, sulfate, chloride or mixtures thereof. Alkaline earth cations can include $Ca^{2+}$, $Mg^{2+}$ or mixtures thereof. In some embodiments, background ionic species comprise alkali cations, such as $Na^+$ and/or $Li^+$, in addition to the alkaline earth cations, chloride and sulfate.

In view of these and other ionic species of the wastewater stream, the pretreatment apparatus can comprise ion exchange media. Various cation exchange media can be employed for removal of cationic species from the wastewater stream. Specific composition of the cation exchange media will depend on the identity of the cationic composition of the wastewater stream. In some embodiments, the pretreatment apparatus comprises cation exchange media for removal of alkaline earth cations and/or alkali cations. In embodiments described herein, alkali cations and/or alkaline earth cations are exchanged to $H^+$ by cation exchange resins. Strong acid cationic exchange media generally comprise sulfonic acid functionalities. For example, a strong acid cation exchange medium can comprise sulfopropyl ($-OHC_2CH_2CH_2SO_3H$) or sulfoethyl functionalities ($-OHC_2CH_2SO_3H$). In other embodiments, the pretreatment apparatus comprises intermediate acid and/or weak acid cation exchange media. Intermediate acid cation exchange media can operate with phosphate ($-OPO_3H_2$) functionalities while weak acid cation exchange media can include carboxyl functionalities, such as carboxymethyl ($-OCH_2CO_2H$) moieties. In some embodiments, strong acid cation exchange media is combined with intermediate and/or weak acid cation exchange media. Such combinations can enhance regeneration efficiencies and reduce costs while maintaining sufficient removal of background cationic species from the wastewater stream.

Pretreatment apparatus, in some embodiments, comprises anion exchange media. In some instances, the anion exchange media demonstrate higher selectivity for background anion species relative to bromide. For example, anion exchange media can be chosen according to higher selectivity to chloride and/or sulfate relative to bromide. Suitable anion exchange media can include OH-form anion exchange media. Strong base anion exchange media generally comprises quaternary ammonium functionalities, such as triethylaminoethyl and diethyl(2-hydroxypropyl) quaternary ammonium functionalities. In embodiments described herein, anions are exchanged to Off by exchange resins. In one embodiment, strong base anion exchange resin is commercially available from Resin Tech of West Berlin, N.J. under the SB-1P OH trade designation. Additional strong base anion exchange resins are commercially available from Dow Chemical of Midland, Mich. under the DOWEX® trade designation. In some embodiments, anion exchange media of the pretreatment apparatus comprises intermediate base and/or weak base anion exchange media. Strong base anion exchange media can also be combined with intermediate and/or weak base anion exchange media. Such combinations can enhance regeneration efficiencies and reduce costs while maintaining sufficient removal of background anionic species.

When both are employed in the pretreatment apparatus, anion and cation exchange media can be located in separate housings. In some embodiments, cation exchange media is positioned in a first set of housings, and anion exchange media is positioned in a second set of housings to avoid precipitate formed in the exchange reactors and pipelines at high pH after anion exchange. Housing for the anion and cation exchange media can be of any dimensions and/or shape consistent with the objectives of the present invention. Housing shape and/or dimensions can be selected according to several considerations including, but not limited to, the desired volume of the housing and desired flow rate of the wastewater stream through the housing. In some embodiments, individual housings are columnar in format. Moreover, the housings can have any spatial arrangement relative to one another. In some embodiments, the first set of housings comprising cation exchange media are arranged serially wherein the wastewater stream flows sequentially through each of the housings. Alternatively, the first set out housings can have a parallel arrangement wherein the wastewater stream is split among two or more subsets of the housings for treatment by the cation exchange media. Splitting the wastewater stream among multiple subsets of housings comprising cation exchange media can increase flow rates of the wastewater stream through the pretreatment apparatus. The second set of housings comprising anion exchange media can also exhibit a serial or parallel arrangement described herein.

In some embodiments, anion and cation exchange media are positioned in the same housing. For example, anion and cation exchange media can be positioned in the same column to provide a composite column. Volume ratio of anion exchange media to cation exchange media in a composite column can generally range from 20:80 to 80:20. Volume ratio can be tailored according to the background ionic species, in some embodiments. Mixed anion and cation exchange resins suitable for use in the pretreatment apparatus are commercially available from Purolite Corp. of Bala Cynwyd, Pa. under the MB400 and MB600 trade designations. Mixed anion and cation exchange resin is also commercially available from Dow Chemical under the AMBER-LITE® MB20 trade designation. Composite columns or composite housings comprising mixed anion and cation exchange resin can have any arrangement in the pretreatment apparatus. In some embodiments, composite columns are arranged serially. Alternatively, composite columns can have parallel arrangement wherein the wastewater stream is split among two or more subsets of the composite columns for treatment by the mixed anion and cation exchange media. Housings for anion exchange media, cation exchange media and/or mixed media can be formed of corrosion resistant materials or lined with corrosion resistant materials. Rubber and polyvinylchloride (PVC), for example, can be employed as housing materials or housing liners.

In some embodiments, various membrane architectures can be used in the pretreatment apparatus to reduce or completely remove background ionic species. One or more background ionic species can be removed from the wastewater stream by nanofiltration, reverse osmosis or electrodeionization (EDI) membranes. The membrane architectures can be used alone or in combination with ion exchange media and/or dilution of the wastewater stream.

The pretreatment apparatus, in some embodiments, does not comprise anion and/or cation exchange media and/or membranes. In such embodiments, the pretreatment apparatus can comprise one or more chambers or conduits for dilution of the wastewater stream. Dilution of the wastewater stream reduces concentration of background ionic species, thereby enhancing bromide capture and/or recovery in the downstream bromide capture apparatus. The chambers and/or conduits can support a dilution factor of any desired value. In some embodiments, the chambers and/or conduits can support dilution of the wastewater stream by a factor of 4 or 5. In other embodiments, the chambers and/or conduits can support dilution of the wastewater stream by a factor of 3 to 10. In additional embodiments, the dilution factor can be greater than 10. Dilution factor for the wastewater stream can be selected according to several considerations including, but not limited to, concentration of background ionic species and desired electrical conductivity of the wastewater stream exiting the pretreatment apparatus. The wastewater stream can be diluted in batches or continuously. During batch dilution, the wastewater stream can be stored in one or more chambers and then diluted the desired amount by the addition of water. Alternatively, water can be added via one or more valves to a conduit transporting the wastewater stream for continuous dilution. Water, for example, can be added to the conduit in such a manner that the proper dilution is achieved prior to the wastewater stream entering the bromide capture apparatus.

The pretreated wastewater exiting the pretreatment apparatus, in some embodiments, has an electrical conductivity less than 5 mS/cm. In some embodiments, the pretreated wastewater has an electrical conductivity selected from Table I.

TABLE I

Electrical Conductivity of Pretreated Wastewater Stream (mS/cm)

| ≤4.5 |
| --- |
| ≤4 |
| ≤3.75 |
| ≤3.5 |
| 1-5 |
| 1.5-4 |
| 0.5-4 |
| 0.5-3 |
| 0.5-2 |

Electrical conductivity of the pretreated wastewater stream can be established by exposure of the wastewater stream to the anionic and/or cationic exchange media of the pretreatment apparatus. Electrical conductivity of the pretreated wastewater stream can also be established by dilution of the wastewater stream in the pretreatment apparatus. In further embodiments, any combination of dilution and exposure to ion exchange media and/or membranes in the pretreatment apparatus can establish electrical conductivity values for the pretreated wastewater stream described herein. Combining dilution with anion and/or cation exchange media in the pretreatment apparatus can reduce amounts of ion exchange media required by systems described herein, thereby generating cost efficiencies and less system downtime for regeneration of the ion exchange media.

The pretreated wastewater stream enters the bromide capture apparatus for bromide removal. In some embodiments, the bromide capture apparatus comprises anion exchange media. The anion exchange media should exhibit higher selectivity for bromide relative to the background ionic species. Suitable anion exchange media can include anion exchange resins. In some embodiments, anion exchange resins for bromide capture are commercially available from Purolite under the A600 and Bromide Plus™ trade designations. The bromide exchange resin for bromide capture apparatus can be positioned in one or more housings. As described herein, the housings can be in series or parallel format. In other embodiments, one or more bromide selective membranes may be used for bromide capture and/or recovery.

Subsequent to the bromide capture apparatus, the wastewater stream can be discharged from the system. The system comprising the pretreatment apparatus and bromide capture apparatus, in some embodiments, can remove bromide from the wastewater stream at an efficiency of at least 80 percent. In some embodiments, systems described herein can have a bromide removal efficiency selected from Table II.

TABLE II

Bromide Removal Efficiency (%)

| ≥85 |
| --- |
| ≥88 |
| ≥90 |
| 85-95 |
| 80-95 |

Bromide captured by the anion exchange media and/or membrane(s) can be collected during regeneration of the exchange media. In some embodiments, bromide can be collected from the anion exchange media as a salt, such as sodium bromide (NaBr). The collected bromide can be reused in various applications, such as mercury control apparatus at coal-fired electric generation stations. In some embodiments, for example, the system further comprises bromide recovery apparatus in fluid communication with the bromide capture apparatus. The bromide recovery apparatus can comprise one or more conduits and/or chambers for collecting and concentrating bromide received or transferred from the bromide capture apparatus.

FIG. 1 illustrates a bromide removal system according to some embodiments described herein. In the embodiment of FIG. 1 the bromide removal system 10 is employed to treat wastewater generated by FGD units associated with a coal-fired power station. The system comprises pretreatment apparatus 11 and bromide capture apparatus 12. The pretreatment apparatus 11 comprises H-form cation exchange media and OH-form anion exchange media for at least partial removal of background ionic species in the FGD wastewater stream including $Ca^{2+}$, $Na^+$, $Cl^-$ and $SO_4^{-2}$. The bromide capture apparatus 12 employs an anionic bromide exchange resin which can elute NaBr when treated with $NaHCO_3$.

II. Methods Bromide Removal

In another aspect, methods of removing bromide from wastewater streams are described herein. A method of removing bromide from a wastewater stream comprises contacting the wastewater stream with pretreatment apparatus operable for at least partial removal of background ionic species from the wastewater stream and/or dilution of the background ionic species in the wastewater stream. The pretreated wastewater stream is subsequently contacted with bromide capture apparatus operable for removal of bromide from the pretreated wastewater stream, wherein bromide is removed from the wastewater stream at an efficiency of at least 80 percent. In some embodiments, bromide is recovered from the capture apparatus and reused in flue gas treatment applications.

Turning now to specific steps, the wastewater stream enters the pretreatment apparatus for at least partial removal of background ionic species from the wastewater stream and/or dilution of the background ionic species in the wastewater stream. The pretreatment apparatus can have any construction and/or properties described in Section I hereinabove. In some embodiments, for example, the wastewater stream contacts anion and/or cation exchange media of the pretreatment apparatus for at least partial removal of background ionic species, such as alkaline earth cations, alkali cations, chloride and/or sulfate. In other embodiments, the wastewater stream is diluted in the pretreatment apparatus. The wastewater stream can be diluted by a factor of 3 to 10. In some embodiments, the wastewater stream can be diluted by a factor greater than 10. Alternatively, the wastewater stream contacts anion and/or cation exchange media of the pretreatment apparatus and is also diluted in the pretreatment apparatus. The pretreated wastewater stream can have conductivity selected from Table I herein upon exiting the pretreatment apparatus.

The pretreated wastewater stream subsequently enters the bromide capture apparatus. The bromide capture apparatus can have any construction and/or properties described in Section I hereinabove. In some embodiments, the bromide capture apparatus comprises anion exchange media. The anion exchange media can exhibit higher selectivity to bromide relative to the background ionic species. Bromide captured by the anion exchange media can be collected during regeneration of the exchange media. In some embodiments, bromide can be collected from the anion exchange media as a salt, such as NaBr. The collected bromide can be reused in various applications, such as mercury control apparatus at coal-fired electric generation stations. Methods described herein employing pretreatment apparatus and bromide capture apparatus, in some embodiments, can remove bromide from the wastewater stream at an efficiency of at least 80 percent. In some embodiments, the methods can have a bromide removal efficiency selected from Table II herein.

These and other embodiments are further illustrated in the following non-limiting examples.

Example 1—Bromide Removal

FGD wastewater from a coal-fired power station having the composition listed in Table III was provided. The FGD wastewater was divided into three independent streams (1-3) for bromide removal testing. The first independent wastewater stream retained the composition of Table III. Bromide was added to the composition of Table III to provide the second independent wastewater stream having composition of Table IV. The third wastewater stream was produced by diluting the composition of Table III with deionized water by a factor of approximately five and had the composition listed in Table V. The third independent wastewater stream was in accordance with systems and methods described herein employing pretreatment by dilution.

TABLE III

FGD Wastewater Composition

| Ionic Species | Concentration (mg/L) |
|---|---|
| $Br^-$ | 24 |
| $Cl^-$ | 2353 |
| $SO_4^{2-}$ | 2024 |

TABLE IV $2^{st}$ Independent Wastewater Stream

| Ionic Species | Concentration (mg/L) |
|---|---|
| $Br^-$ | 97 |
| $Cl^-$ | 2353 |
| $SO_4^{2-}$ | 2024 |

TABLE V $3^{nd}$ Independent Wastewater Stream

| Ionic Species | Concentration (mg/L) |
|---|---|
| $Br^-$ | 4.5 |
| $Cl^-$ | 418 |
| $SO_4^{2-}$ | 355 |

The first independent wastewater stream was added to a batch vessel with Purolite A600 anion exchange media. The first independent wastewater stream was separated from the anion exchange media by filtration after a time period of 15 minutes. This procedure was repeated for each of the second and third independent wastewater streams. Concentrations and bromide removal efficiencies subsequent to treatment of the first, second and third independent wastewater streams are provided in Table VI.

TABLE VI

Bromide Removal Efficiency

| Ionic Species | First Ind. Wastewater Stream | Second Ind. Wastewater Stream | Third Ind. Wastewater Stream |
|---|---|---|---|
| $Br^-$ (mg/L) | 10.15 | 36 | 0.5 |
| $Cl^-$ (mg/L) | 2553 | 2467 | 635 |
| $SO_4^{2-}$ (mg/L) | 1630 | N.A. | 135 |
| Bromide Removal Efficiency | 58% | 63% | 89% |

As provided in Table VI, systems and methods described herein comprising pretreatment of the wastewater stream via dilution provided substantially higher bromide removal efficiency compared to prior systems and methods wherein the wastewater stream is not treated to remove and/or dilute background ionic species prior to exposure to bromide-selective exchange media. As evidenced in Table VI, the prior systems only achieved bromide removal efficiency of approximately 60% regardless of bromide concentration.

Example 2—Bromide Removal

FGD wastewater from a coal-fired power station having the composition listed in Table III was provided. The FGD wastewater was divided into three independent streams (4-6) for bromide removal testing. The fourth independent wastewater stream retained the composition of Table III. Compositional parameters of the fifth and sixth independent wastewater streams are provided in Tables VII and VIII, respectively. The fifth independent wastewater stream was produced by diluting the composition of Table III with deionized water by a factor of approximately five.

TABLE VII $5^{th}$ Independent Wastewater Stream

| Ionic Species | Concentration (mg/L) |
|---|---|
| $Br^-$ | 4.5 |
| $Cl^-$ | 418 |
| $SO_4^{2-}$ | 355 |

TABLE VIII $6^{th}$ Independent Wastewater Stream

| Ionic Species | Concentration (mg/L) |
|---|---|
| $Br^-$ | 24.5 |
| $Cl^-$ | 418 |
| $SO_4^{2-}$ | 355 |

Notably, the sixth independent wastewater stream was produced by adding bromide to the fifth independent wastewater stream, wherein the chloride and sulfate concentrations remained static. The fifth and sixth independent wastewater streams are in accordance with systems and methods described herein employing pretreatment by dilution.

The fourth independent wastewater stream was added to a batch vessel with Purolite A600 anion exchange media. The fourth independent wastewater stream was separated from the anion exchange media by filtration after a time period of 15 minutes. This procedure was repeated for each of the fifth and sixth independent wastewater streams. Concentrations and bromide removal efficiencies subsequent to treatment of the first and second independent wastewater streams are provided in Table IX.

TABLE IX

Bromide Removal Efficiency

| Ionic Species | Fourth Ind. Wastewater Stream | Fifth Ind. Wastewater Stream | Sixth Ind. Wastewater Stream |
|---|---|---|---|
| $Br^-$ (mg/L) | 36 | 0.5 | 4 |
| $Cl^-$ (mg/L) | 2467 | 635 | 645 |
| $SO_4^{2-}$ (mg/L) | N.A. | 135 | 135 |
| Bromide Removal Efficiency | 63% | 89% | 84% |

As provided in Table IX, systems and methods described herein comprising pretreatment of the wastewater stream via dilution provided substantially higher bromide removal efficiency compared to prior systems and methods wherein the wastewater stream is not treated to remove and/or dilute background ionic species prior to exposure to bromide-selective exchange media. As evidenced in Table IX, the removal efficiencies exhibited by the fifth and sixth wastewater streams was largely independent of bromide concentration indicating high efficiency across a spectrum of bromide concentrations in wastewater once concentration background ionic species has been reduced via pretreatment as described herein.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A system for removing bromide from a wastewater stream comprising:
   pretreatment apparatus comprising a first set of housings comprising cation exchange media and a second set of housings comprising anion exchange media for at least partial removal of background ionic species from the wastewater stream, the background ionic species comprising alkaline earth cations, alkali cations, sulfate, chloride or mixtures thereof; and
   bromide capture apparatus comprising separation media exhibiting higher selectivity for bromide relative to the background ionic species, the separation media being operable for removal of bromide from the pretreated wastewater stream, wherein the system removes bromide from the wastewater stream at an efficiency of at least 80 percent, and wherein the first set of housings and the second set of housings have a serial arrangement such that the wastewater stream flows sequentially through the first set of housings prior to flowing through the second set of housings.

2. The system of claim 1, wherein electrical conductivity of wastewater stream is less than 5 mS/cm upon exit of the pretreatment apparatus.

3. The system of claim 1, wherein electrical conductivity of wastewater stream is less than 3.5 mS/cm upon exit of the pretreatment apparatus.

4. The system of claim 1, wherein the separation media comprises strong base anion exchange media.

5. The system of claim 4, wherein the strong base anion exchange media comprises quaternary ammonium functionalities.

6. The system of claim 1 further comprising one or more bromide collection chambers or conduits connected to the bromide capture apparatus.

7. The system of claim 1, wherein the wastewater is sourced from wet flue gas desulfurization apparatus.

8. The system of claim 7, wherein the system removes bromide from the wastewater at an efficiency of at least 85 percent.

9. The system of claim 1 further comprising bromide recovery apparatus in fluid communication with the bromide capture apparatus, the bromide recovery apparatus comprising one or more chambers for collection and concentration of bromide received from the bromide capture apparatus.

10. The system of claim 1, wherein the anion exchange media comprises OH-form anion exchange media.

* * * * *